(12) United States Patent
De Bock et al.

(10) Patent No.: US 7,462,962 B2
(45) Date of Patent: Dec. 9, 2008

(54) COOLING SYSTEM FOR AN ELECTRICAL MACHINE WITH CENTER ROTOR COOLING DUSTS

(75) Inventors: Hendrik Pieter Jacobus De Bock, Clifton Park, NY (US); James Jonathan Grant, Niskayuna, NY (US); Samir A. Salamah, Niskayuna, NY (US); Norman Suguitan, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 408 days.

(21) Appl. No.: 11/150,270

(22) Filed: Jun. 13, 2005

(65) Prior Publication Data

US 2006/0279145 A1    Dec. 14, 2006

(51) Int. Cl.
*H02K 9/06* (2006.01)
(52) U.S. Cl. .................. 310/58; 310/60 A; 310/61
(58) Field of Classification Search ................. 310/52, 310/58–59, 90 R, 60 A, 61
See application file for complete search history.

(56) References Cited

U.S. PATENT DOCUMENTS

| | | | | |
|---|---|---|---|---|
| 3,440,462 A | * | 4/1969 | Willyoung | 310/61 |
| 3,660,702 A | * | 5/1972 | Kishino | 310/61 |
| 5,633,543 A | * | 5/1997 | Jarczynski et al. | 310/59 |
| 5,652,469 A | | 7/1997 | Boardman et al. | |

FOREIGN PATENT DOCUMENTS

JP      54115708 A   *   9/1979

* cited by examiner

*Primary Examiner*—Tran Nguyen
(74) *Attorney, Agent, or Firm*—Nixon & Vanderhye, PC

(57) ABSTRACT

An electrical machine includes a stator having a radically inwardly directed duct adjacent the center of the machine for flowing cooling medium into the gap between the stator and rotor. The rotor includes radial or diagonal ducts having scoops for directing flow generally radically inwardly to cool the field windings in the center of the machine. The cooling medium flows either into subslots for radial or diagonal outward flow through outlet ducts for return to the gap.

18 Claims, 4 Drawing Sheets

COOLING SYSTEM FOR AN ELECTRICAL MACHINE WITH CENTER ROTOR COOLING DUSTS

The present invention relates to rotating electrical machines and particularly relates to machines having a core cooling ventilation system.

BACKGROUND OF THE INVENTION

In rotating electrical machines, e.g. generators, subslots, open at opposite ends of a rotor, typically underlie the field windings of the rotor. Radial cooling slots extend through the windings in communication with the subslots. A cooling medium is supplied and flows from opposite ends of the rotor through the subslots and the radial cooling ducts of the field windings and exits into the gap between the rotor and the stator. Thus the cooling medium, for example air, is in direct heat exchange relation with the coils of the rotor field windings.

This type of cooling ventilation system has proven satisfactory particularly for small machines having a limited length, e.g. on the order of less than 200 inches. For larger machines, for example rotors in excess of 200 inches, the long rotors limit the flow of the cooling medium through the subslots. That is, the cumulative cross sectional area of the subslots is considerably less than the cumulative cross sectional area of the radial ducts. This causes a large pressure drop at the entrance locations to the radial cooling ducts and insufficient flow of the cooling medium into the middle or intermediate portions of the rotor.

Various arrangements have been proposed and constructed to provide additional cooling to the intermediate portions of the rotors in these longer rotating machines. For example, scoops at the inlet holes have been used to force the cooling medium into the windings by impact between the cooling medium and the rotating rotor. Diagonal cooling medium flow ducts have also been utilized where the cooling medium flows inwardly to the bottom of the coils through holes slightly axially offset in successive turns and is allowed to return through other similarly axially offset holes to the rotor surface and gap. Reverse flow ventilation systems have also been utilized such as disclosed in U.S. Pat. No. 5,652,469. However, there remains a need for providing improved cooling and ventilation particularly in intermediate regions of the rotor in longer electrical machines.

BRIEF DESCRIPTION OF THE INVENTION

In a preferred embodiment of the present invention there is provided a rotating electrical machine comprising a rotor having field windings and a stator about the rotor; a cooling system for the machine including a plurality of generally axially extending subslots opening through opposite ends of the rotor and underlying respective portions of the rotor field windings and a plurality of ducts extending through the field windings adjacent opposite end portions of the rotor in communication with the subslots for receiving a cooling medium flowing axially along the subslots and discharging the cooling medium into a gap between the stator and rotor; the stator including cooling medium inlet ducts intermediate opposite end portions of the machine for flowing cooling medium toward the gap and the rotor, the rotor having a plurality of inlet ducts and outlet ducts intermediate opposite end portions of the rotor for flowing the cooling medium received from the intermediate stator ducts inwardly along the intermediate rotor inlet ducts and outwardly along the intermediate rotor outlet ducts into the gap.

DETAILED DESCRIPTION OF THE INVENTION

Figure 1:
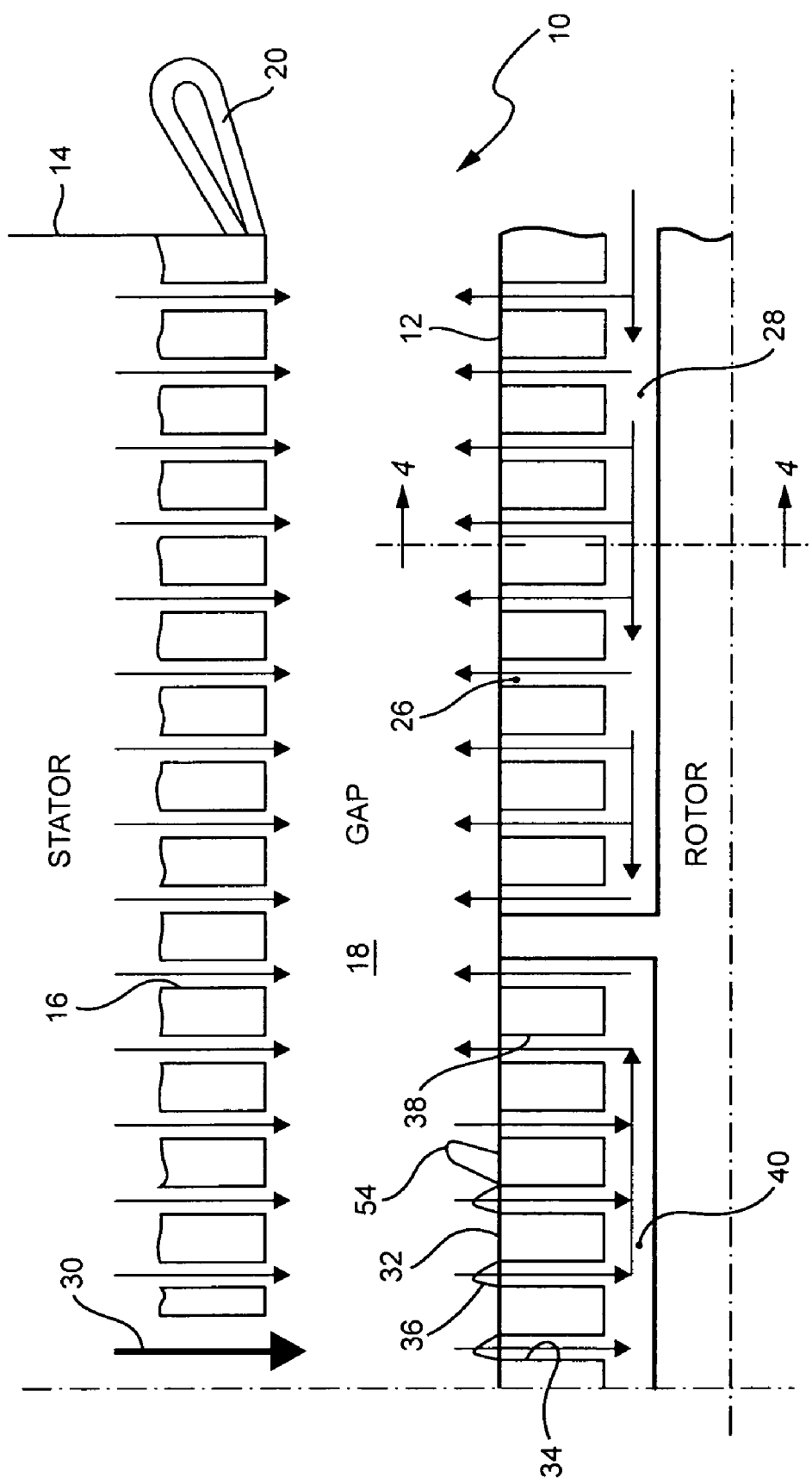
FIG. 1 is a schematic illustration of one half of an electrical machine comprised of a stator and a rotor with the drawing figure illustrating various flows of the cooling medium through the machine.

Referring to the drawings, particularly to FIG. 1, there is illustrated an electrical machine generally designated 10 including a rotor 12 and a stator 14. The illustration depicts one end and a portion of the center of the machine, the opposite end being similar. As illustrated, stator 14 includes a plurality of radially inwardly directed ducts 16 for flowing a cooling medium radially inwardly into the air gap 18 between the stator and rotor. It will be appreciated that the air gap 18 is shown in considerably exaggerated depth not to scale for clarity of this description and that typically the air gap is maintained a minimum depth for purposes of maintaining efficiency of the machine. Also illustrated are end windings 20 for the stator 14.

Figure 4:
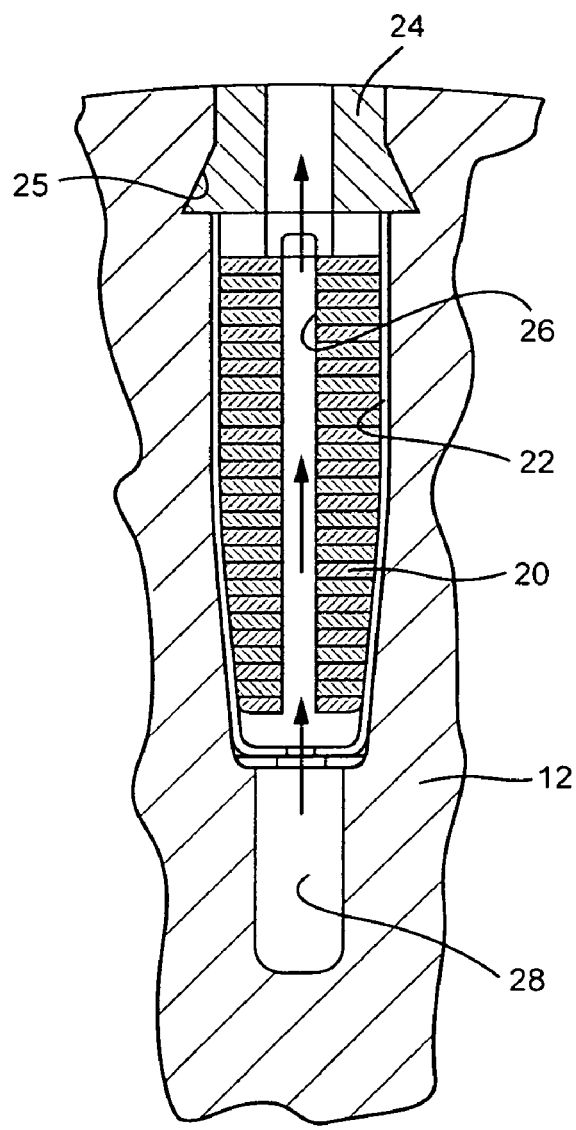
FIG. 4 is a cross sectional view taken generally about on line 4-4 in FIG. 1.

As illustrated in FIGS. 1 and 4, rotor 12 includes a plurality of field windings 20 which extend longitudinally along the rotor in slots 22 formed at circumferentially spaced locations about the rotor. The field windings are conventional in construction and are maintained in the slots 22 by wedges 24 which are secured to the rotor in grooves 25 formed adjacent the outer circumference of the rotor. The field windings through each slot 22 have radially registering cooling holes forming ducts 26 for flowing a cooling medium about the field windings 20. The cooling medium is supplied to the ducts 26 through axially extending subslots 28 open at opposite ends of rotor 12.

As also illustrated in FIG. 1, stator cooling slots 16 are provided and the cooling medium flowing through slots 16 exit into the air gap 18 similarly as the cooling medium flowing through the slots 26 exits into gap 18. The cooling medium in the air gap 18 typically flows through the annular outer ends of the air gap at the ends of the rotor and stator.

For long rotors, however, the intermediate portion of the rotor has flow requirements which may not be met by the typical axially inward flows through the subslots 28. As a consequence, significant heat build-up occurs in central portions of the rotors particularly in these longer electrical machines. To provide for additional cooling flows in the central or intermediate portions of these long electrical machines, and in one embodiment of the present invention, additional cooling flows for the rotor are provided through the stator via an intermediate stator inlet duct 30. The central or intermediate portion 32 of the rotor is also provided with radially inward flow ducts 34 having scoops 36 at the surface of the rotor. While the scoops 36 are illustrated as projecting beyond the peripheral surface of the rotor, the scoops 36 in practice lie below the surface of the rotor. The scoops 36 direct the cooling medium supplied to the air gap 18 via intermediate stator inlet duct 36 radially inwardly through the inlet ducts 34. The cooling medium flow then feeds a subslot 40 and vents outwardly through radial outwardly directed ducts 38. The subslots 40 may also lie in communication with the subslot 28. It will be appreciated that the cooling medium supplied via stator inlet ducts 30 cools intermediate portions of the rotor, particularly those intermediate rotor portions for long electrical machines.

Figure 2:
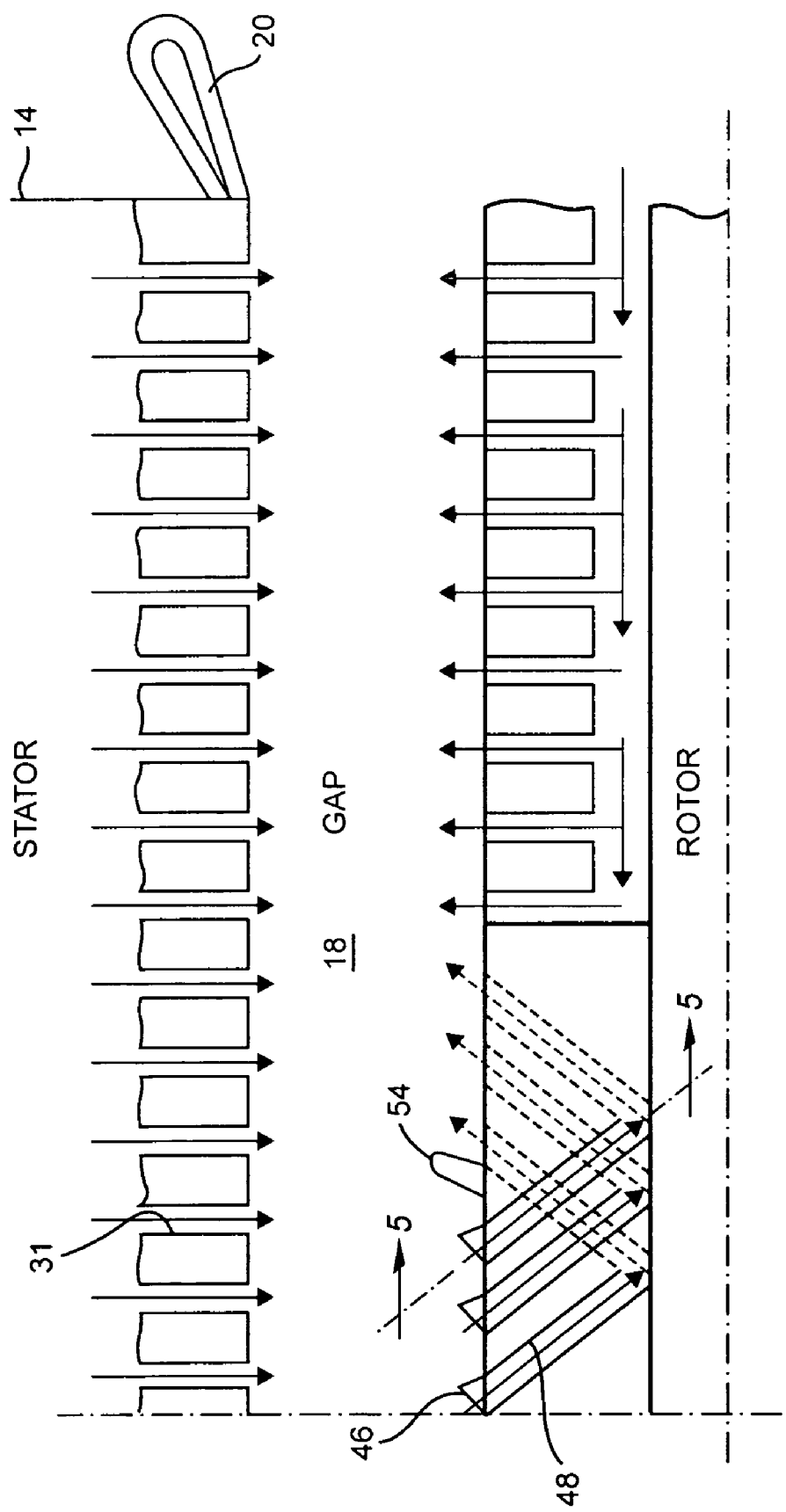
FIG. 2 is similar to FIG. 1 illustrating a diagonal flow intermediate cooling system.
Figure 5:
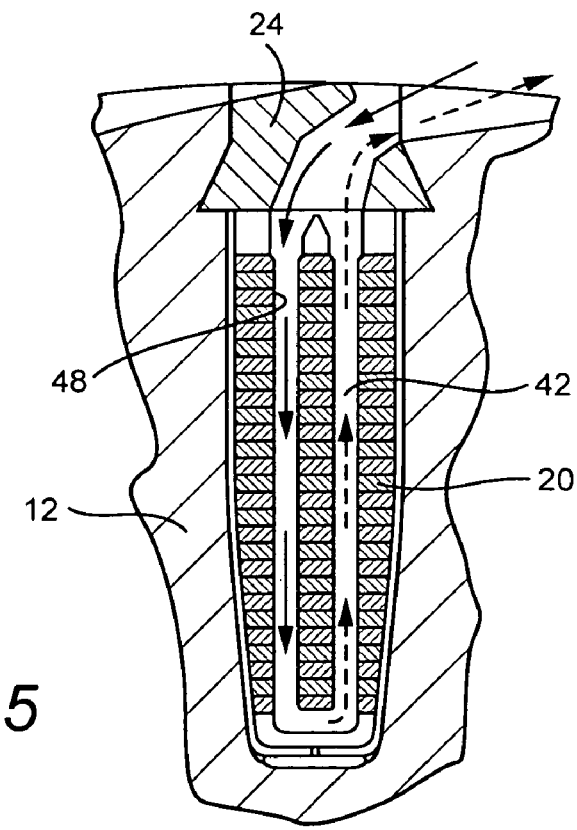
FIG. 5 is a schematic cross sectional view taken generally about on line 5-5 in FIG. 2.

Referring to FIG. 2, the cooling air flow from the intermediate stator inlet duct 30 or a series of stator inlet ducts 31 may be received across gap 18 by diagonally directed rotor inlet ducts 40. Referring to FIGS. 2 and 5, the diagonal ducts 40 through the field windings communicate the cooling medium in the central portion of the machine from the air gap 18 in radially inward and axial directions. Adjacent the bottom of each slot 22, the cooling medium reverses flow direction and flows generally radially and axially outwardly through diagonal outlet ducts 42 which open into air gap 18. The diagonal inlet ducts 40 may similarly, as illustrated in FIG. 1, have inlet scoops 46 to assist in directing the flow in a radial inward direction.

Figure 3:
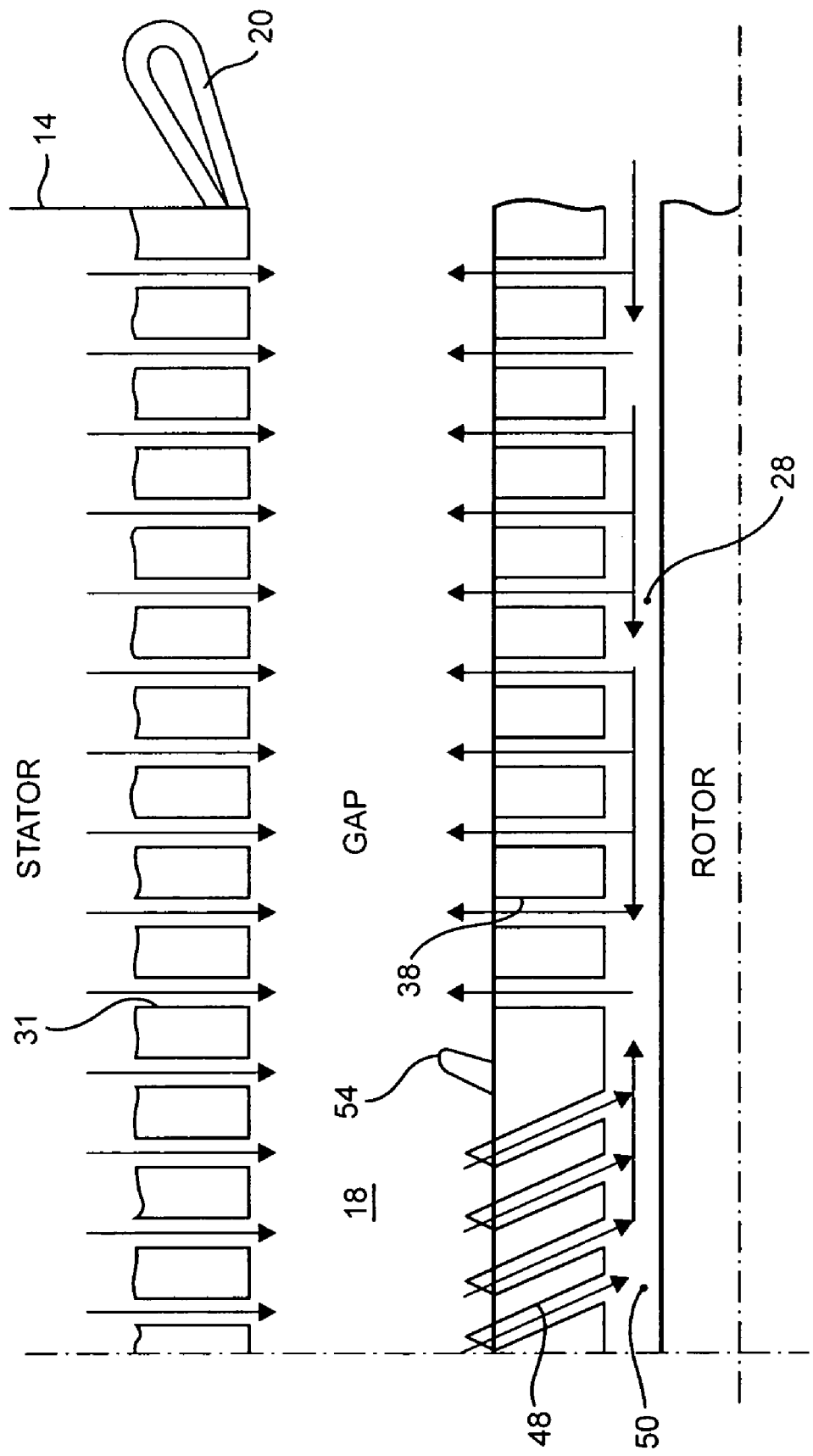
FIG. 3 is a view similar to FIG. 1 illustrating a further embodiment of the present invention.

Alternatively as illustrated in FIG. 3, diagonally extending inlet ducts 48 through the field windings in the central or intermediate portion of the machine may communicate with an axially extending subslot 50 for flowing the cooling medium generally axially along the rotor underlying the centrally located portions of the field windings. The subslots 50 may communicate with radially outwardly directed ducts 26 and with the subslot 28 of the rotor. In each of these embodiments of FIGS. 1-3, a baffle 54 may be provided in the air gap 18 to separate the cold flow of cooling medium from the stator from the hot flow coming from the rotor ducts into the air gap. The baffle 54 may be located on either the rotor or stator.

It will be appreciated that by providing a cooling medium directly through a stator inlet duct adjacent the central or intermediate portion of the electrical machine, additional cooling medium may be supplied to the central or intermediate portion of the rotor. The scoops on the rotor provide extra flow and impart a velocity to the additional cooling flow to permit that flow to flow radially inwardly as the rotor is rotating. The rotational velocity of the rotor, of course, assists the outflow of the additional cooling medium from the bottom of the field winding slots or the subslots. As a consequence, the central or intermediate portions of the rotor may be cooled without increasing the typical subslot ventilation cross-sectional area. Moreover the reduction in flow through the subslots reduces the velocity of the flow in the rotor subslots resulting in improved uniform manifold distribution in the radial ducts. Lower pressure losses also occur in the subslots with resultant increased efficiency of the machine. Further, the flow inlet in the center or intermediate section of the machine reduces the pressure in the rotor/stator gap resulting in additional flow through the stator center section.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rotating electrical machine comprising:
    a rotor having field windings and a stator about said rotor;
    a cooling system for the machine including a plurality of generally axially extending subslots opening through opposite ends of the rotor and underlying respective portions of the rotor field windings and a plurality of ducts extending through the field windings adjacent opposite end portions of the rotor in communication with the subslots for receiving a cooling medium flowing axially along said subslots and discharging the cooling medium into a gap between the stator and rotor;
    said stator including cooling medium inlet ducts intermediate opposite end portions of the machine for flowing cooling medium toward said gap and said rotor, said rotor having a plurality of inlet ducts and outlet ducts intermediate opposite end portions of the rotor for flowing the cooling medium received from said intermediate stator ducts inwardly along said intermediate rotor inlet ducts and outwardly along said intermediate rotor outlet ducts into the gap.

2. A machine according to claim 1 wherein said intermediate rotor inlet ducts have scoops at radial outer ends for collecting the cooling medium in the gap received from the stator intermediate cooling medium inlet ducts and flowing the cooling medium inwardly of the rotor.

3. A machine according to claim 1 including a baffle between the cooling medium discharged into the gap from said end rotor ducts and the cooling medium discharged into the gap from said intermediate rotor outlet ducts.

4. A rotating electrical machine comprising:
    a rotor having field windings and a stator about said rotor;
    a cooling system for the machine including a plurality of generally axially extending subslots opening through opposite ends of the rotor and underlying respective portions of the rotor field windings and a plurality of ducts extending through the field windings adjacent opposite end portions of the rotor in communication with the subslots for receiving a cooling medium flowing axially along said subslots and discharging the cooling medium into a gap between the stator and rotor;
    said stator including cooling medium inlet ducts intermediate opposite end portions of the machine for flowing cooling medium toward said gap and said rotor, said rotor having a plurality of inlet ducts and outlet ducts intermediate opposite end portions of the rotor for flowing the cooling medium received from said intermediate stator ducts inwardly along said intermediate rotor inlet ducts and outwardly along said intermediate rotor outlet ducts into the gap; and
    wherein said rotor includes a plurality of subslots located intermediate opposite end portions of the rotor in communication with the intermediate rotor inlet ducts for flowing the cooling medium received therefrom into the intermediate rotor outlet ducts.

5. A machine according to claim 1 wherein said intermediate rotor inlet ducts and said intermediate rotor outlet ducts are disposed at angles to radii of said rotor.

6. A machine according to claim 5 wherein said intermediate rotor inlet ducts have scoops at radial outer ends for collecting the cooling medium in the gap received from the stator intermediate cooling medium inlet ducts and flowing the cooling medium inwardly of the rotor.

7. A machine according to claim 5 including a baffle between the cooling medium discharged into the gap from said end rotor ducts and the cooling medium discharged into the gap from said intermediate rotor outlet ducts.

8. A machine according to claim 1 wherein said intermediate rotor inlet ducts extend at angles to radii of the rotor and said intermediate outlet ducts extend radically of the rotor.

9. A rotating electrical machine comprising:
    a rotor having field windings and a stator about said rotor;
    a cooling system for the machine including a plurality of generally axially extending subslots opening through opposite ends of the rotor and underlying respective portions of the rotor field windings and a plurality of ducts extending through the field windings adjacent opposite end portions of the rotor in communication with the subslots for receiving a cooling medium flowing axially along said subslots and discharging the cooling medium into a gap between the stator and rotor;

said stator including cooling medium inlet ducts intermediate opposite end portions of the machine for flowing cooling medium toward said gap and said rotor, said rotor having a plurality of inlet ducts and outlet ducts intermediate opposite end portions of the rotor for flowing the cooling medium received from said intermediate stator ducts inwardly along said intermediate rotor inlet ducts and outwardly along said intermediate rotor outlet ducts into the gap;

wherein said intermediate rotor inlet ducts extend at angles to radii of the rotor and said intermediate outlet ducts extend radically of the rotor; and wherein the intermediate rotor inlet ducts lie in communication with axially extending subslots lying in communication with said intermediate outlet ducts.

10. A machine according to claim 9 wherein said intermediate rotor inlet ducts have scoops at radial outer ends for collecting the cooling medium in the gap received from the stator intermediate cooling medium inlet ducts and flowing the cooling medium inwardly of the rotor.

11. A machine according to claim 9 including a baffle between the cooling medium discharged into the gap from said end rotor ducts and the cooling medium discharged into the gap from said intermediate rotor outlet ducts.

12. A machine according to claim 4 wherein said intermediate rotor inlet ducts have scoops at radial outer ends for collecting the cooling medium in the gap received from the stator intermediate cooling medium inlet ducts and flowing the cooling medium inwardly of the rotor.

13. A machine according to claim 4 including a baffle between the cooling medium discharged into the gap from said end rotor ducts and the cooling medium discharged into the gap from said intermediate rotor outlet ducts.

14. A machine according to claim 4 wherein said intermediate rotor inlet ducts and said intermediate rotor outlet ducts are disposed at angles to radii of said rotor.

15. A machine according to claim 14 wherein said intermediate rotor inlet ducts have scoops at radial outer ends for collecting the cooling medium in the gap received from the stator intermediate cooling medium inlet ducts and flowing the cooling medium inwardly of the rotor.

16. A machine according to claim 14 including a baffle between the cooling medium discharged into the gap from said end rotor ducts and the cooling medium discharged into the gap from said intermediate rotor outlet ducts.

17. A machine according to claim 4 wherein said intermediate rotor inlet ducts extend at angles to radii of the rotor and said intermediate outlet ducts extend radically of the rotor.

18. A machine according to claim 17 wherein the intermediate rotor inlet ducts lie in communication with axially extending subslots lying in communication with said intermediate outlet ducts.

* * * * *